United States Patent [19]

Sukman et al.

[11] 3,755,214

[45] Aug. 28, 1973

[54] THIOPHENE CONDENSATES AS FLAME RETARDANTS FOR POLYURETHANE FOAM

[75] Inventors: Edward L. Sukman, Fanwood; Irving Touval, Edison, both of N.J.

[73] Assignee: M & T Chemicals Inc., Greenwich, Conn.

[22] Filed: Nov. 12, 1971

[21] Appl. No.: 198,469

[52] U.S. Cl. 260/2.5 AJ, 260/45.8 R, 260/DIG. 24, 260/329 P, 260/332.3 R, 260/332.3 P, 260/332.5
[51] Int. Cl... C08g 22/44, C08g 51/52, C07d 63/14
[58] Field of Search ............... 260/45.8 R, 2.5 AJ, 260/329 P, 332.3 R, 332.3 P, 332.5

[56] References Cited
UNITED STATES PATENTS

| | | | |
|---|---|---|---|
| 2,502,391 | 3/1950 | Rittershausen et al. | 260/23.7 |
| 3,098,848 | 7/1963 | Braus et al. | 260/329 |
| 3,557,068 | 1/1971 | Huber | 260/79.7 |
| 3,414,588 | 12/1968 | Jones | 260/340.7 |
| 3,671,547 | 6/1972 | Stevick | 260/329 |

*Primary Examiner*—Donald E. Czaja
*Assistant Examiner*—H. S. Cockeram
*Attorney*—Kenneth G. Wheeles

[57] ABSTRACT

Condensation products obtained by reacting thiophene with aldehydes or ketones react with bromine or chlorine under relatively mild conditions. The novel products are effective flame retardants for synthetic polymers, particularly polyurethane foams.

9 Claims, No Drawings

THIOPHENE CONDENSATES AS FLAME RETARDANTS FOR POLYURETHANE FOAM

BACKGROUND

This invention relates to halogenated condensation products obtained by reacting thiophene with aldehydes or ketones. This invention also relates to flame-retardant polymer compositions containing the aforementioned halogenated thiophene condensation products.

With the increasing use of polymeric materials, as in the construction industry for example, the flame retardant characteristics of these materials have become increasingly important. In the face of increasingly strict governmental regulations, efforts are being made to develop additives for polymers and resins which will impart flame retardant characteristics without adversely affecting other desirable properties, e.g. color, of the final composition or, even more importantly, degrading the mechanical characteristics of the polymer so as to decrease its effectiveness for a given end use.

In addition to good performance, the cost of the flame retardant is an important consideration for those commercial applications in which thousands of pounds of polymer will be produced in a single run.

A variety of antimony compounds, e.g. antimony oxide, in combination with a halogen source, e.g. a halogenated hydrocarbon, impart flame retardancy to many polymer compositions without interfering with their stability either in the environment in which they are to be used or during their preparation. The antimony compound reduces the amount of halogen required to attain a desired degree of flame retardancy. A major shortcoming of antimony compounds is their adverse effect on the optical properties of polymeric materials when the compounds are employed at concentration levels required to attain an adequate degree of flame retardancy.

Many otherwise useful flame retardants are sufficiently volatile and/or unstable that a substantial portion is lost at the elevated temperatures employed during formulating and shaping of high melting polymer compositions. This is especially true for polyesters, which are processed at temperatures above about 250° C.

It is well known that flame retardant properties can be imparted to polymer compositions by the addition of one or more chlorinated or brominated hydrocarbons. Chlorinated compounds as a class are less than desirable because of the high concentrations required to obtain an effective amount of the halogen at flame temperatures.

Aliphatic halogenated hydrocarbons are relatively unstable at temperatures employed during processing of polymer compositions. The halogen evolved during decomposition of these compounds may impart an undesirable color to the polymer. The brominated derivatives of aromatic, aliphatic, and cycloaliphatic hydrocarbons are considerably less stable than the corresponding chlorinated derivatives. At the other extreme, the bond between chlorine and carbons of aromatic ring structures is so strong that only a relatively small portion of the potentially available chlorine is released at flame temperatures. Inordinately high concentrations of these compounds are, therefore, required to obtain a useful degree of flame retardancy.

An objective of this invention is to provide compounds which are effective flame retardants yet do not adversely affect the properties of polymer compositions into which they are incorporated.

A second objective is to provide effective flame retardants that do not volatilize or decompose to any appreciable extent at temperatures employed to process synthetic polymers, which may be up to 250° C.

It has now been found that flame-retardant and heat stable polymer compositions can be prepared using halogenated condensation products of thiophene and aldehydes or ketones as the flame retarding agent.

SUMMARY OF THE INVENTION

This invention concerns flame-retardant polymer compositions which contain between 20 and 50 percent by weight of a thiophene derivative exhibiting a general formula selected from the group consisting of:

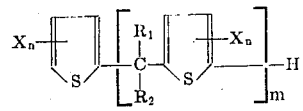

and

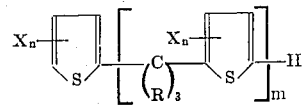

wherein $R_1$ and $R_2$ are independently selected from the group consisting of hydrogen atoms and alkyl, aryl, alkaryl and aralkyl radicals containing up to 12 carbon atoms and $R_3$ represents a linear alkylene radical containing 4 or 5 carbon atoms, X represents a chlorine or bromine atom and m and n are independently selected from the integers 1 and 2.

This invention also concerns the halogenated thiophene-ketone and thiophene-aldehyde condensates described in the foregoing paragraph, which are novel compounds.

DETAILED DESCRIPTION OF THE INVENTION

A. Preparation of the Halogenated Condensation Products

The novel flame retardants of this invention are halogenated condensation products of aldehydes or ketones and thiophene. The non-halogenated precursors are conveniently prepared by reacting thiophene with the appropriate aldehyde or ketone in the presence of a strong mineral acid, e.g. sulfuric acid. The procedure is described by J. Schick and D. Crowley in an article which appeared in the Journal of the American Chemical Society [Volume 73, page 1377 (March, 1951)]. The reaction is preferably carried out at elevated temperatures, i.e., above about 60° C. Following initiation the reaction often becomes self-sustaining. Cooling may be necessary to maintain the temperature below 100° C. Once the exothermic portion of the reaction is substantially complete, the application of external heating is often desirable to maintain the temperature at between 50° and 100° C. for a period of time sufficient to ensure a substantially complete reaction.

The aldehydes and ketones employed in preparing the condensation products exhibit the general formula

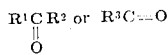

wherein $R^1$ and $R^2$ are individually selected from hydrogen atoms and alkyl, aryl, aralkyl and alkaryl radicals containing up to 12 carbon atoms. $R^3$ represents an alkylene radical containing 4 or 5 carbon atoms. $R^1$, $R^2$ and $R^3$ may contain inert substituents, e.g. nitro, alkoxy and halogen which will not react to any significant extent during the condensation and subsequent halogenation reactions.

Condensation products of thiophene with ketones or aldehydes react with bromine or chlorine under relatively mild conditions at or near ambient temperature to yield a major product wherein halogen replaces one or more hydrogen atoms on the thiophene ring structure. It may be desirable to dissolve the condensation product in an inert organic solvent, e.g. chloroform, prior to addition of the halogen. The halogenated product is preferably treated with an alkali metal hydroxide or other suitable base to remove any hydrogen halide resulting from cleavage of labile bonds between halogen and carbon atoms of structures represented by $R^1$, $R^2$, and $R^3$ in the foregoing formulae. To further stabilize the compound, it is preferably reacted with a trialkyl or triaryl phosphite to the extent that the final product contains up to about 5 percent by weight of phosphorus. In addition to being a known flame-retardant, the phosphite reacts at easily cleaved halogen-carbon bonds wherein the carbon atom is part of am aliphatic or cycloaliphatic hydrocarbon structure. If the thiophene condensate were not reacted with the phosphite, the labile halogen-carbon bonds may be cleaved during storage and/or processing of the polymer composition. The hydrogen halide resulting from this bond cleavage is undesirable, since it may discolor the final polymer composition or adversely affect its physical properties. The hydrocarbon groups of the phosphite may contain various substituents some of which may be reactive toward precursors of the polymers into which the condensates can be incorporated.

B. The Use of Halogenated Thiophene-Ketone or -Aldehyde Condensates as Flame Retardants Compounds containing halogen atoms bonded to the carbon atoms of a thiophene ring structure are particularly desirable as flame retardants. Below flame temperatures the halogen-carbon bonds are not cleaved to any appreciable extent with the result that little or no evolution of halogen occurs during processing of the polymer, which may employ temperatures of up to 250° C. for aromatic polyesters. In addition to decreasing the efficacy of the flame retardant, the halogen may discolor the polymer, making it unsuitable for many end uses. At flame temperatures the sulfur atom of thiophene is believed to undergo oxidation, which considerably weakens the carbon-halogen bond, thereby making the free halogen available to extinguish the flame.

The halogenated condensation products of this invention are considerably less volatile than brominated or chlorinated thiophene, making them eminently suitable for use as flame retardants with a variety of synthetic polymers.

The concentration of halogenated thiophenekctone or thiophene-aldehyde condensate required to impart a desired level of flame retardation to polymers is a function of several factors, including the halogen content of the condensation product, the type of halogen present (chlorine or bromine) and the particular polymer substrate being modified. Generally, a concentration within the range between 10 and 60 percent by weight is sufficient to render most polymer compositions self-extinguishing when evaluated in accordance with the American Society for Testing of Materials (ASTM) test method number 1962.

An additional advantage of the present flame retardants is that they are liquid at ambient temperature, in contrast to many halogen-containing flame retardants which are solid materials. They can, therefore, be readily blended into the polymer or prepolymer being modified with a minimum of processing time. An enhanced degree of flame retardance can be obtained by employing the halogenated thiophene condensates in combination with known flame-retarding agents, e.g. trialkyl and triaryl phosphates.

Polyurethane foams are a particularly preferred substrate for use with the halogenated thiophene derivatives of this invention. The foams are prepared by reacting a polyfunctional isocyanate with a material containing two or more hydroxyl groups on each molecule in the presence of various known catalysts and modifiers. Preferred starting materials and reaction conditions are described in the accompanying examples, which should not be interpreted as limiting the scope of this invention.

In addition to polyurethane foams the halogenated thiophene condensates of this invention will impart excellent flame retardant properties to a wide variety of synthetic polymers, including polyamides, polyesters, vinyl polymers, acrylic polymers [e.g. poly (methyl methacrylate)] phenol-aldehyde condensation products and epoxide polymers, e.g. the product formed by polymerization of the diglycidyl ether of bis-phenol A [2,2 bis(4,4′-dihydroxyphenyl) propane].

EXAMPLE 1 - Preparation of Brominated Condensation Products Derived from Thiophene and Acetone A. Thiophene (269 g.), acetone (116 g.) and 642 g. of a 75 percent by weight aqueous solution of sulfuric acid were combined in a reaction vessel and heated with agitation to a temperature of 60° C., at which time the reaction became exothermic and external heating was discontinued. The temperature of the reaction mixture spontaneously increased to about 90° C. When the temperature began to decrease, external heating was reapplied to maintain the reaction mixture at a temperature of 90° C. for one hour. The oil which separated upon cooling the reaction mixture was removed, washed with an aqueous solution of sodium bicarbonate, then dried using anhydrous magnesium sulfate. The product remaining following removal of the chloroform weighed 308 g. and contained 27.4 weight percent of sulfur. A 100 g. portion of this material was dissolved in 200 c.c. of chloroform. Liquid bromine (200 g.) was added gradually to the solution over a two hour period, during which the reaction mixture was maintained at 30° C. Following completion of the bromine addition the reaction mixture was combined with 200 c.c. of a 10 percent by weight aqueous solution of sodium hydroxide and then heated at the boiling point for 2 hours. The chloroform-containing layer was separated, washed with water and then dried over anhydrous magnesium sulfate. Removal of the chloroform yielded 175 g. of product containing 49.5 percent of bromine.

B. Reacting a 100 g. portion of the acetonethiophene condensate with 326 g. of bromine as described in the preceding paragraph yielded 248 g. of a product that contained 62.5 percent of bromine.

C. A product containing 71 percent of bromine was prepared by reacting 329 g. of the condensate of part A with 1540 g. of bromine. The product was heated to the boiling point in the presence of 1 liter of 10 weight percent aqueous sodium hydroxide solution, after which the organic layer was separated, dried over anhydrous magnesium sulfate and the chloroform removed by distillation to yield 1044 g. of brominated product. Heating the brominated product for four hours at 160°–70° C. in the presence of 50 g. of triethylphosphite followed by removal of excess phosphite yielded 190 g. of a material that contained 59.6 weight percent of bromine, 8.55 weight percent of sulfur and 2.17 weight percent of phosphorus.

EXAMPLE 2 - Preparation of Brominated Thiophene-Ketone Condensation Products Derived from Methylethyl Ketone, Cyclohexanone and Methyl Isobutyl Ketone The condensation products were prepared using the procedure described in Example 1 by reacting 168 g. of thiophene, 400 g. of 70 weight percent aqueous sulfuric acid and the following amounts of ketones; methylethyl ketone - 72 g.; cyclohexanone - 98 g.; methyl isobutyl ketone - 100 g. A 180 g. portion of each product was dissolved in 250 cc. of chloroform, reacted with 840 g. of bromine and then washed with 1 liter of 10 percent by weight aqueous sodium hydroxide. After drying and removal of the chloroform, the products were viscous liquids containing between 67 and 68 percent by weight of bromine.

EXAMPLE 3 - Preparation and Evaluation of Flame-Retardant Polyurethanes

A polyurethane foam was prepared using the following ingredients. All parts are by weight.
Polyol G-435 (a tetrahydroxy compound; hydroxyl number = 435) - 100 parts
Diethylethanol amine - 1 part
Stannous Octoate - 1 part
Surfactant (a silicone polymer) - 1.5 parts
Liquid Fluorocarbon blowing agent - 37 parts
Brominated thiophene condensate - as specified The foregoing ingredients were thoroughly blended for 8 – 10 seconds using a mechanically driven high speed agitator and the resultant homogeneous mixture combined with 109 parts of polymethylene polyphenylisocyanate (distributed by the Upjohn Company). This composition was then blended, poured into an open top container and allowed to rise.

The flame-retarding performance of the various brominated thiophene-ketone condensates was determined using the Limiting Oxygen Index value, which provides a useful criterion for determining the flammability of various materials. The method employed to determine this value for polymer samples is described in ASTM Test Method No. D-2863-70. The test samples are placed in a vertically oriented Pyrex glass tube of approximately 3.5 inches (8.9 centimeters) in diameter and 17.7 inches (45.0 centimeters) in height, which has a bed of glass beads disposed at the bottom thereof and a holder located about six inches (15 cm.) above the glass beads, by which the samples are maintained in a vertical position. The gas is introduced at the bottom of the tube by allowing it to flow up through the glass beads. The gas is pure nitrogen, pure oxygen, or a specified mixture of the two. The flow of gas is controlled and monitored by means of suitable valves and flow meters. A flame is then touched to the test sample and the minimum oxygen concentration required to support combustion is noted. The limiting oxygen index is then calculated using the following formula:

Limiting Oxygen Index = LOI $[O_2] \times 100/[O_2] + [N_2]$ wherein $[O_2]$ represents the minimum oxygen concentration required to support combustion and $[N_2]$ represents the corresponding concentration of nitrogen.

The L.O.I. values obtained for the polyurethane compositions are summarized in Table I. Some of the compositions were evaluated using 10 parts by weight of tricresyl phosphate as an auxiliary flame retardant.

TABLE 1

| Ketone portion of condensate | Percent by weight of bromine in condensate | Parts of condensate | Percent by weight of bromine in total composition | Parts of tricresyl phosphate | L.O.I. value |
|---|---|---|---|---|---|
| Acetone | 71.0 | 20 | 5.3 | 0 | 20.6 |
| Do | [1] 59.6 | 20 | 4.4 | 0 | 21.0 |
| Do | 60.1 | 28 | 6.0 | 10 | 22.9 |
| Do | 60.1 | 40 | 8.4 | 0 | 23.2 |
| Do | 49.5 | 34 | 6.0 | 10 | 23.2 |
| Do | 49.5 | 48 | 8.0 | 0 | 23.7 |
| Cyclohexanone | 68.1 | 35 | 8.2 | 0 | |
| Methyl isobutyl ketone | 67.6 | 27 | 6.8 | 0 | |

[1] Also contains 2% phosphorus (condensate reacted with triethyl phosphite); all of the polymers tested were self-extinguishing when rated using ASTM Test Procedure 1692.

By comparison, a polyurethane foam containing no flame retardant burns completely when ignited in air.

Although this invention has been disclosed by reference to specific examples, it will be apparent to those skilled in the art that various modifications and changes may be made thereto which fall within the scope of the appended claims.

What is claimed is:

1. A flame-retardant polymer composition containing between 20 and 50 percent by weight of a thiophene derivative exhibiting a general formula selected from the group consisting of:

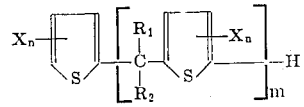

and 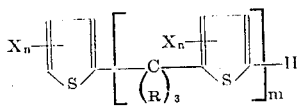

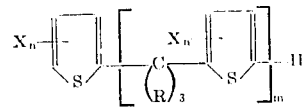

wherein $R_1$ and $R_2$ are independently selected from the group consisting of hydrogen atoms and alkyl, aryl, alkaryl, and aralkyl radicals containing up to 12 carbon atoms and $R_3$ represents a linear alkylene radical containing 4 or 5 carbon atoms, X represents a chlorine or bromine atom and m and n are independently selected from the integers 1 and 2.

2. The flame-retardant polymer composition of claim 1 wherein the polymer is a polyurethane.

3. The flame-retardant polymer composition of claim 1 wherein $R_1$ and $R_2$ are independently selected from the group consisting of alkyl radicals containing between 1 and 4 carbon atoms, inclusive and X represents a bromine atom.

4. The flame-retardant polymer composition of claim 1 wherein $R_3$ contains 5 carbon atoms.

5. A halogenated thiophene condensation product exhibiting a general formula selected from the group consisting of:

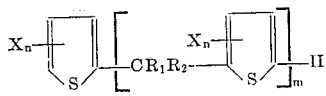

wherein $R_1$ and $R_2$ are independently selected from the group consisting of hydrogen atoms, alkyl, aryl, alkaryl, and aralkyl radicals containing up to 12 carbon atoms and $R_3$ represents a linear alkylene radical containing 4 or 5 carbon atoms, X represents a chlorine or bromine atom and m and n are independently selected from the integers 1 and 2.

6. A halogenated thiophene-condensation product as described in claim 5 wherein $R_1$ and $R_2$ are independently selected from the group consisting of alkyl radicals containing between 1 and 4 carbon atoms, inclusive, and X represents a bromine atom.

7. A halogenated thiophene-condensation product as described in claim 5 wherein $R_3$ contains 5 carbon atoms and X represents a bromine atom.

8. A flame-retardant polymer composition containing between 20 and 50 percent by weight of a compound which is the reaction product of the thiophene derivative of claim 1 with a trialkyl phosphite, said compound containing up to about 5 percent by weight of phosphorus.

9. A halogenated thiophene derivative which is the reaction product of the condensation product of claim 5 with a trialkyl or triaryl phosphite, said derivative containing up to about 5 percent by weight of phosphorus.

* * * * *